(12) United States Patent
Orofino, II et al.

(10) Patent No.: US 7,424,410 B2
(45) Date of Patent: Sep. 9, 2008

(54) APPLYING CONSTRAINTS TO BLOCK DIAGRAM MODELS

(75) Inventors: Donald Paul Orofino, II, Sudbury, MA (US); Michael James Longfritz, Waltham, MA (US); Ramamurthy Mani, Needham, MA (US); Darel Allen Linebarger, Southborough, MA (US)

(73) Assignee: The MathWorks, Inc., Natick, MA (US)

( * ) Notice: Subject to any disclaimer, the term of this patent is extended or adjusted under 35 U.S.C. 154(b) by 492 days.

(21) Appl. No.: 10/424,990

(22) Filed: Apr. 28, 2003

(65) Prior Publication Data

US 2004/0215441 A1  Oct. 28, 2004

(51) Int. Cl.
*G06F 7/60* (2006.01)
(52) U.S. Cl. ......................................................... 703/2
(58) Field of Classification Search .................. 703/1, 703/2; 700/28–32
See application file for complete search history.

(56) References Cited

U.S. PATENT DOCUMENTS

| | | | | |
|---|---|---|---|---|
| 5,590,049 A | * | 12/1996 | Arora | 716/5 |
| 5,842,196 A | * | 11/1998 | Agarwal et al. | 707/2 |
| 6,662,167 B1 | * | 12/2003 | Xiao | 706/13 |
| 2005/0222827 A1 | * | 10/2005 | Emek et al. | 703/2 |

OTHER PUBLICATIONS

Bishop, Robert. 1997, Addison Wesley Longman, Inc., Modem Control Systems Analysis And Design Using Matlab And Simulink, pp. Viii-Xii, 1-16, 95-102, 104-117, 211-221.*

Simulink, Model-based and System-based Design, Version 4, The MathWork, Inc. 1990-2001, pp. 1-xvi, 1-1-1-10, 4-1-4-130, 9-1-9-117.*

* cited by examiner

Primary Examiner—Paul L Rodriguez
Assistant Examiner—Eunhee Kim
(74) Attorney, Agent, or Firm—Lahive & Cockfield, LLP; Kevin J. Canning

(57) ABSTRACT

A method includes in a system determining a constraint for constraining operation of a portion of a block diagram model, determining if the portion of the block diagram model violates the constraint, and providing a user information based on the violating of the first constraint.

59 Claims, 7 Drawing Sheets

APPLYING CONSTRAINTS TO BLOCK DIAGRAM MODELS

FIELD OF THE INVENTION

The present invention relates to applying constraints to block diagram models.

BACKGROUND

Block diagram models are used in software to reduce complexity in representing, designing, and simulating signal-processing systems. In general, by using block diagrams models, signal processing systems can be represented as a cascade of components that perform a series of processing operations and transformations on input signals for producing output signals to simulate the operation of the signal processing system implemented in hardware, software, or other manufactured state.

Typically, function blocks are included in block diagram models to represent individual functions of the signal processing system. Additionally, the block diagram models include lines for representing interconnections between the function blocks and representing data flow through the block diagram model. Typically the number of interconnections included in a model grows proportionally with the complexity of the model. For example, a block diagram model representing a complex communication system may include thousands of interconnected function blocks that each includes one or more settings that control the function performed by the function block.

SUMMARY

In an aspect, the invention features a method including in a system determining a first constraint for constraining operation of a first portion of a block diagram model, determining if the first portion of the block diagram model violates the first constraint, and providing a user information based on the violating of the first constraint.

Embodiments can include one or more of the following. Determining if a second portion of the block diagram model can operate with improved performance, and providing the user a modification based on the second portion of the block diagram executing with improved performance. The first constraint can be stored. The first constraint can be stored with the first portion of the block diagram model. Determining the first constraint can include receiving the first constraint from a storage device. The first constraint can be removed from constraining operation of the first portion of the block diagram model. Determining if the first portion of the block diagram model violates the first constraint can include the user selecting the first portion of the block diagram model. The method of claim 1 in which the first portion of the block diagram model can include a function block. The first portion of the block diagram model can include an entire block diagram model. The first portion of the block diagram model can include a type of function block. The first constraint can be based on data used by the first portion of the block diagram model. The first constraint can be based on an attribute of a fixed-point number. The first constraint can be based on a business entity. The second portion can include the first portion of the block diagram model. Determining the first constraint for constraining operation of the first portion of the block diagram model can include receiving the first constraint and a second constraint. Determining the first constraint for constraining operation of the first portion of the block diagram model can include determining if the first constraint and the second constraint are redundant. Determining the first constraint for constraining operation of the first portion of the block diagram model can include determining if the first constraint and the second constraint conflict. A first file can include the first constraint and identify a second file that can include the second constraint. The first constraint and the second constraint can be stored. The first constraint can be removed from constraining operation of the first portion of the block diagram model. The first portion of the block diagram model can be constrained to meet the first constraint if the first portion of the block diagram model violates the first constraint.

In another aspect, the invention features a method including in a system determining if a first portion of a block diagram model can operate with improved performance, and providing a user a first modification for operating the first portion of the block diagram model with improved performance.

Embodiments can include one or more of the following. A first constraint for constraining operation of a second portion of the block diagram model can be determined, determining if the second portion of the block diagram model violates the first constraint, and providing the user information based on the violating of the first constraint. The first modification can be ranked. The first modification can be stored. Determining the first modification can include receiving the first modification from a storage device. Determining the first modification can include receiving a performance condition. The performance condition can be based on improved memory use. The performance condition can be based on improved execution speed. Determining if the first portion of the block diagram model can operate with improved performance can include a user selecting the first portion of the block diagram model. The first portion of the block diagram model can include a function block. Providing the first modification for operating the first portion of the block diagram model with improved performance can include receiving the first modification and a second modification. Providing the first modification can include determining if the first modification and the second modification are redundant. Providing the first modification can include determining if the first modification and the second modification conflict. The first modification and the second modification can be ranked. The user can be provided the second modification for operating the first portion of the block diagram model with improved performance.

In another aspect, the invention features a constraint applying process that includes a first determining process to determine a first constraint for constraining operation of a first portion of a block diagram model, a second determining process to determine if the first portion of the block diagram model violates the first constraint, and a first providing process to provide a user information based on the violating of the first constraint.

Embodiments can include one or more of the following. The constraint applying process can include a third determining process to determine if a second portion of the block diagram model can operate with improved performance, and a second providing process to provide the user a modification based on the second portion of the block diagram operating with improved performance. The constraint applying process can include a storing process to store the first constraint. The constraint applying process can include a storing process to store the first constraint with the first portion of the block diagram model. Determining the first constraint can include receiving the first constraint from a storage device. The constraint applying process can include a removing process to remove the first constraint from constraining operation of the first portion of the block diagram model. Determining if the first portion of the block diagram model violates the first constraint can include the user selecting the first portion of the block diagram model. The first portion of the block diagram model can include a function block. The first portion of the block diagram model can include an entire block diagram model. The first portion of the block diagram model can include a type of function block. The first constraint can be based on data used by the first portion of the block diagram model. The first constraint can be based on an attribute of a fixed-point number. The first constraint can be based on a business entity. The second portion can include the first portion of the block diagram model. Determining the first constraint for constraining operation of the first portion of the block diagram model can include receiving the first constraint and a second constraint. Determining the first constraint for constraining operation of the first portion of the block diagram model can include determining if the first constraint and the second constraint are redundant. Determining the first constraint for constraining operation of the first portion of the block diagram model can include determining if the first constraint and the second constraint conflict. A first file can include the first constraint and identify a second file that can include the second constraint. The constraint applying process can include a storing process to store the first constraint and the second constraint. The constraint applying process can include a removing process to remove the first constraint from constraining operation of the first portion of the block diagram model. The constraint applying process can a constraining process to constrain the first portion of the block diagram model to meet the first constraint if the first portion of the block diagram model violates the first constraint.

In another aspect, the invention features an optimizing process for a block diagram model that includes a first determining process to determine if a portion of a block diagram model can operate with improved performance, and a first providing process to provide a user a first modification for operating the first portion of the block diagram model with improved performance.

Embodiments can include one or more of the following. The optimizing process can include a second determining process to determine a first constraint for constraining operation of a second portion of the block diagram model, a third determining process to determine if the second portion of the block diagram model violates the first constraint, and a second providing process to provide the user information based on the violating of the first constraint. The optimizing process can include a ranking process to rank the first modification. The optimizing process can include a storing process to store the first modification. Determining the first modification can include receiving the first modification from a storage device. Determining the first modification can include receiving a performance condition. The performance condition can be based on improved memory use. The performance can be based on improved execution speed. Determining if the first portion of the block diagram model can operate with improved performance can include a user selecting the first portion of the block diagram model. The first portion of the block diagram model can include a function block. Providing the first modification for operating the first portion of the block diagram model with improved performance can include receiving the first modification and a second modification. Providing the first modification can include determining if the first modification and the second modification are redundant. Providing the first modification can include determining if the first modification and the second modification conflict. The optimizing process can include a ranking process to rank the first modification and the second modification. The optimizing process can include a providing process to provide the user the second modification for operating the first portion of the block diagram model with improved performance.

In another aspect, the invention features a computer program product residing on a computer readable medium that includes instructions for applying a constraint and cause a computer to determine a first constraint for constraining operation of a first portion of a block diagram model, determine if the first portion of the block diagram model violates the first constraint, and provide a user information based on the violating of the first constraint.

The computer program product can include instructions to cause a computer to determine if a second portion of the block diagram model can execute with improved performance, and provide the user a modification based on the second portion of the block diagram operating with improved performance. The computer program product can include instructions to cause a computer to store the first constraint. The computer program product can include instructions to cause a computer to store the first constraint with the first portion of the block diagram model. To determine the first constraint can include receiving the first constraint from a storage device. The computer program product can include instructions to cause a computer to remove the first constraint from constraining operation of the first portion of the block diagram model. To determine if the first portion of the block diagram model violates the first constraint can include the user selecting the first portion of the block diagram model. The first portion of the block diagram model can include a function block. The first portion of the block diagram model can include an entire block diagram model. The first portion of the block model can include a type of function block. The first constraint can be based on data used by the first portion of the block diagram model. The first constraint can be based on an attribute of a fixed-point number. The first constraint can be based on a business entity. The second portion can include the first portion of the block diagram model. To determine the first constraint for constraining operation of the first portion of the block diagram model can include receiving the first constraint and a second constraint. To determine the first constraint for constraining operation of the first portion of the block diagram model can include determining if the first constraint and the second constraint are redundant. To determine the first constraint for constraining operation of the first portion of the block diagram model can include determining if the first constraint and the second constraint conflict. A first file can include the first constraint and identify a second file that can include the second constraint. The computer program product can include instructions to cause a computer to store the first constraint and the second constraint. The computer program product can include instructions to cause a computer to remove the first constraint from constraining operation of the first portion of the block diagram model. The computer program product can include instructions to cause a computer to constrain the first portion of the block diagram model to meet the first constraint if the first portion of the block diagram model violates the first constraint.

In another aspect, the invention features a computer program product residing on a computer readable medium that includes instructions for optimizing performance of a block diagram model and cause a computer to determine if a first portion of a block diagram model can operate with improved performance, and provide a user a first modification for operating the first portion of the block diagram model with improved performance.

Embodiments can include one or more of the following. The computer program product can include instructions to cause a computer to determine a first constraint for constraining operation of a second portion of the block diagram model, determine if the second portion of the block diagram model violates the first constraint, and provide the user information based on the violating of the first constraint. The computer program product can include instructions to cause a computer to rank the first modification. The computer program product can include instructions to cause a computer to store the first modification. To determine the first modification can include receiving the first modification from a storage device. To determine the first modification can include receiving a performance condition. The performance condition can be based on improved memory use. The performance condition can be based on improved execution speed. To determine if the first portion of the block diagram model can operate with improved performance can include a user selecting the first portion of the block diagram model. The first portion of the block diagram model can include a function block. To provide the first modification for operating the first portion of the block diagram model with improved performance can include receiving the first modification and a second modification. To provide the first modification can include determining if the first modification and the second modification are redundant. To provide the first modification can include determining if the first modification and the second modification conflict. The computer program product can include instructions to cause a computer to rank the first modification and the second modification. The computer program product can include instructions to cause a computer to provide the user the second modification for operating the first portion of the block diagram model with improved performance.

In another aspect, the invention features a graphical user interface (GUI) including a workspace, a set of graphical semantics for determining a first constraint for constraining operation of a first portion of a block diagram model, a set of graphical semantics for determining if the first portion of the block diagram model violates the first constraint, and a set of graphical semantics for providing a user information based on the violating of the first constraint.

Embodiments can include one or more of the following. The graphical user interface can include a set of graphical semantics for determining if a second portion of the block diagram model can operate with improved performance, and a set of graphical semantics for providing the user a modification based on the second portion of the block diagram operating with improved performance.

The invention can include one or more of the following advantages. By applying one or more constraints to a block diagram model, possible operation modes of the block diagram model are reduced. By reducing the operations, inefficient and non-desired operations are disabled without a user providing excessive time and effort to alter the settings of each individual function block included in the block diagram model. Further, by managing the application of the constraints, the user can appropriately plan at what times and stages in a development effort to apply different constraints. Additionally by optimizing block diagram models under development, modifications can be determined and made so that the models execute faster, use less memory during execution, and be stored in less memory space. Once constrained, the applied constraints, or block diagram model with the applied constraints, can be stored for later accessing be a user and use with other block diagram models under development.

Other features, objects, and advantages of the invention will be apparent from the description and drawings, and from the claims.

DETAILED DESCRIPTION

Figure 1:
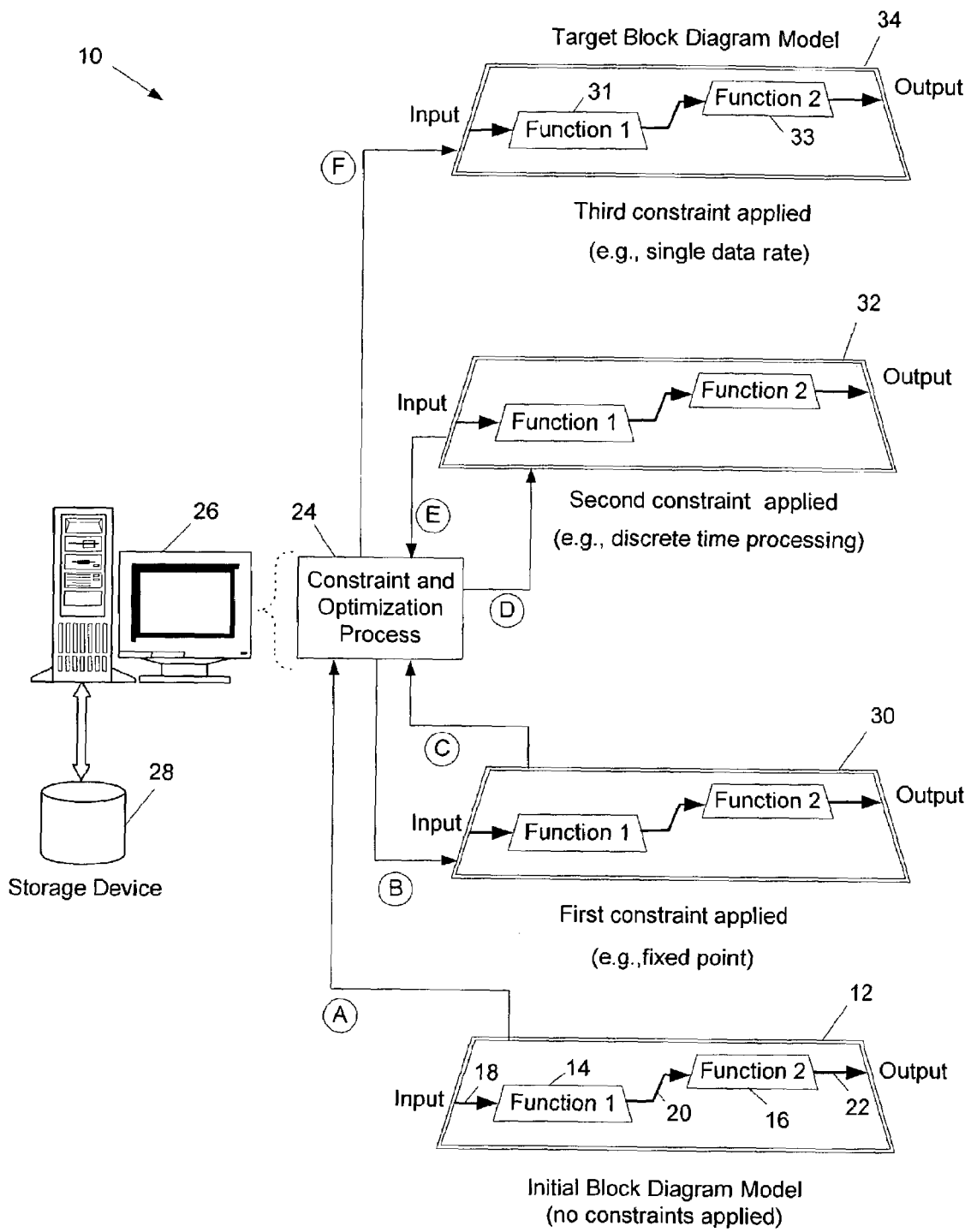
FIG. 1 is a system for constraining and optimizing performance of a block diagram.

Referring to FIG. 1, an exemplary constraining and optimizing system 10 includes a block diagram model 12 developed by a user to process input data received by the block diagram model 12 and to transfer processed output data. To process the input data, the block diagram model 12 includes two function blocks 14, 16 that perform respective functions 1 and 2 on the data sequentially passed to each function block 14, 16 as represented by lines 18, 20, 22 to trace a particular path data takes from input to output of the block diagram model 12. The performance of each respective function block 14, 16 is controlled by one or more settings associated with each function block 14, 16. For example, a setting associated with function block 14 selects whether function 1 performs floating-point or fixed-point computations. Additionally, settings associated with function block 14 are used to select attributes of the fixed or floating-point operations. For example, a setting associated with function block 14 selects the number of bits used in fixed-point operations.

In this example, the block diagram model 12 includes only two function blocks 14, 16 that are each associated with one or more settings. However, by adding more function blocks (not shown) to the block diagram model 12, the number of associated settings increases and can become a burden for the user to set and/or check to determine if the settings associated with the numerous function blocks conflict or reduce operational efficiency of the entire block diagram model. For example, the user can design the block diagram model 12 to perform only fixed-point computations. Thereby, the user will need to check settings for both function block 14 and function block 16 for fixed-point operation. As the number of function blocks in the block diagram model 12 increases, large amounts of user time and effort are needed to place the block diagram model 12 in a desired target condition of fixed-point operation.

By constraining one or more settings of each appropriate function block 14, 16 in the block diagram model 12, operations performed by each function block 14, 16 are targeted by the constrained setting without the user checking each setting associated with each function block 14, 16 or resolving conflicts between the settings of the two function blocks 14, 16. By constraining a function block, possible values of the settings associated with the function block are reduced. By reducing the set of potential values, the capabilities of the function block are focused to operate with the reduced set of values. For example, while function block 14 is capable of operating with either fixed point or floating point numbers, the function block 14 can be constrained to operation with only a reduced set of these capabilities (e.g., only fixed-point operations).

Additionally, performance of the block diagram model 12 or each of the individual function blocks 14, 16 can be optimized to meet one or more conditions. For example, by optimizing the performance, the block diagram model 12 or the individual function blocks 14, 16 are modified to meet conditions such as faster execution times, improved memory use, or other similar performance conditions.

For constraining and optimizing the block diagram model 12, a constraint and optimization process 24 executes on a computer system 26 to apply constraints to the block diagram model 12 along with alerting the user of potential modifications to the block diagram model 12 to satisfy optimizing conditions for improving the performance of the block diagram model 12. In some arrangements, the constraint and optimization process 24 is stored on a storage device 28 (e.g., a hard drive, CD-ROM, etc.) that is connected to the computer system 26. Additionally, in some arrangements the storage device 28 stores the block diagram model 12 if the model was previously developed or can store portions of the block diagram model 12 e.g., if the model 12 is under development.

The computer system 26 executes the constraint and optimization process 24 such that the block diagram model 12 is received from the storage device 28 or memory (not shown) that is also included in the computer system 26. As shown in FIG. 1, "A" represents the constraint and optimization process 24 receiving the block diagram model 12. The constraint and optimization process 24 also receives one or more constraints that are typically selected by the user from a file stored on the storage device 28. For example, the user can select a constraint for constraining the block diagram model 12 to fixed-point operations. The constraint and optimization process 24 then checks the block diagram model 12 and alerts the user if one or more of the function blocks 14, 16 conflicts with this constraint. In some arrangements the constraint and optimization process 24 constrains the potential settings associated with the function blocks to eliminate a detected conflict. For example, if the block diagram model 12 is to be constrained to fixed-point operations, the constraint and optimization process 24 constrains the settings associated with each function block 14, 16 to only fixed point settings.

As represented with "B", once alerted, the user can select a respective constrained value for each of the one or more settings associated with the conflicting function blocks 14, 16 to produce a block diagram model 30 constrained for fixed-point operations. After the user selects a constrained value for each setting, and the modified block diagram 30 is capable of functioning, the constraint applied is stored on the storage unit 28. Additionally, in some arrangements the applied constraint is stored with the modified block diagram model 30 on the storage unit 28. By storing the applied constraint, with or without the block diagram model 30, in a sense, a back-up copy of the block diagram model 30 is stored and can be retrieved from the storage device 28 to allow the user to restore the block diagram model after applying one or more further constraints. Besides producing a restorable copy of the block diagram model 30, the stored constraint can also be retrieved from the storage unit 28 for applying to another block diagram model that is under development. Also, by storing the constraint for use in other block diagram model developments, the user can produce one or more libraries of stored constraints that are quickly accessible and reduce model development time.

As shown with "C", once modified, the constraint and optimization process 24 applies another constraint to the block diagram model 30. In this particular example, the second applied constraint constrains the function blocks included in the block diagram model 30 to performing discrete time processing. Similar to "B", if the constraint and optimization process 24 determines that one or more of the function blocks is not performing discrete time processing, in "D" the user is alerted to the conflict with the second constraint and provided information to modify the one or more of the settings associated with the function blocks to resolve the conflict and produce block diagram block 32. Again, after block diagram model 32 meets the second constraint, and is functioning appropriately, the second constraint, along with the first constraint, are stored on the storage device 28. By storing the first and second constraint, the two constraints can be re-applied if the block diagram model 32 is further constrained or if either of the two constraints are removed.

In "E", the block diagram model 32 is further constrained by the constraint and optimization process 24 such that the function blocks operate at a single data rate. Once the third constraint is applied, as shown in "F", the user can then select the single data rate for each of the function blocks included in the block diagram model 34 to constrain the block diagram model 32 to a single data rate. In this particular example, if the either of the function blocks 31, 33 in the block diagram model 34 are set for multiple data rates, the constraint and optimization process 24 alerts the user to this conflict with the third constraint and provides information so that the user can modify the settings of the function blocks 31, 33 to resolve the conflict. Similar to block diagram models 32 and 34, once the third constraint is applied, and block diagram model 34 is functioning appropriately, all three constraints are stored on the storage device 28. Again, by storing the constraints, all three constraints can be used to restore the block diagram model 34 after further modification by the user. Additionally, the stored three constrained can be applied to other block diagram models under development.

Figure 2A:
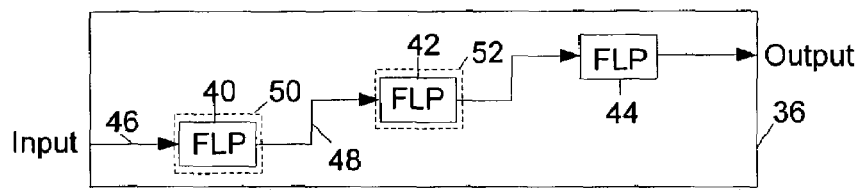
FIG. 2a-f depicts constraining and optimizing a block diagram model.

Referring to FIGS. 2*a-f*, a series is shown depicting portions of a block diagram model 36 being constrained and optimized by the constraint and optimization process 24 (shown in FIG. 1). Referring to FIG. 2*a*, the block diagram model 36 includes three function blocks 40, 42, 44. Function block 40 receives input data from a connection line 46, processes the input data with a floating-point operation, and transfers output data to the function block 42 over a connection line 48. Similarly function block 42 and function block 44 execute respective floating-point operations, as represented with label "FLP", on received data prior to output data being transferred from the block diagram model 36. In this particular example, the user targets a portion of the block diagram model 36 for fixed-point operations by selecting the individual function blocks 40 and 42. To constrain the selected function blocks 40, 42, the user selects the constraint provided by the constraint and optimization process 24, or the constraint can be retrieved from a library of constraints stored on the storage unit 28 (shown in FIG. 1), or other similar method such as receiving the constraint from another block diagram model (not shown) under development or previously developed.

In this particular example, the user selection is shown with dashed line boxes 50, 52 that respectively contain the two function blocks 40, 42. By selecting these two function blocks 40, 42 the constraint and optimization process 24 only constrains setting associated with either of the selected function blocks and determines if either selected function block conflicts with the fixed-point operation constraint. Also, the non-selected function block 44 is not constrained or checked for conflicting with the constraint. In this particular example, after constraining the selected function blocks 40 and 42 for fixed-point operations, the constraint and optimization process 24 determines that both of the selected function blocks conflict with the constraint.

Figure 2B:
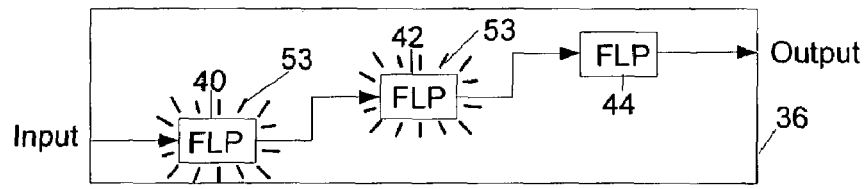

Referring to FIG. 2b, once the constraint and optimization process 24 determines that both selected function blocks 40, 42 conflict with the constraint, the constraint and optimization process 24 alerts the user to the conflict. For example, the two block functions 40, 42 with conflicting settings are each respectively highlighted 53 by the constraint and optimization process 24 to alert the user. Once the user is alerted, the settings of each function block are modified by the user to match the constrained settings for fixed-point operations. However, in some arrangements a user can decide not to modify settings of either or both function blocks 40, 42 and dismiss the alert provided by the constraint and optimization process 24. Also, in some arrangements the constraint and optimization process 24 provides options to the user for modifying the settings of the conflicting function blocks 40, 42. Further, in some arrangements, by applying a constraint to a selected portion of the block diagram model 36, the constraint and optimization process 24 modifies the settings of the selected function blocks to resolve any conflicts with the applied constraint.

Figure 2C:
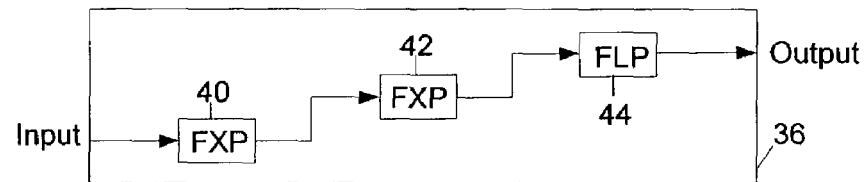

Referring to FIG. 2c, the block diagram 36 is shown after the user has modified the settings of the function blocks 40, 42 for fixed-point operations as represented with "FXP" labels on each of the two block functions. By modifying the settings to match the applied constraint, the conflict between the constraint and the user-selected function blocks is resolved. Additionally, the constraint and optimization process 24 determines that the block diagram model 36 is in a functioning state and stores the applied constraint in the storage device 28. By storing the constraint for fixed-point operations with respect to function block 40 and 42, the user can use the stored constraint to revert the block diagram model 36 to this particular functioning state if the block diagram model is further modified by the user. Also, by storing the constraint, the user can access the constraint for application to a different block diagram model under development or previously developed. By applying the stored constraint, different block diagram models can be quickly placed in a similar functioning state as the block diagram model 36 shown in FIG. 2c. Further by storing the constraint, a library of constraints can be developed to aid in block diagram model development. Also, in some arrangements, the block diagram models or the individual function blocks are stored with the applied constraint. Further, in some arrangements the applied constraint is not stored in the storage device 28.

Figure 2D:
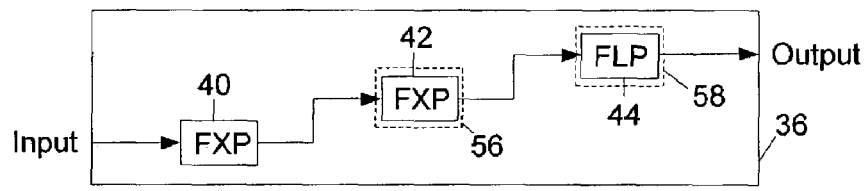

Referring to FIG. 2d, once the fixed-point constraint conflict is resolved, in this particular example, the user selects to constrain block functions 42 and 44 to operate at a single data rate. Similar to FIG. 2a, since the user selected function blocks 42 and 44, both selections are represented with respective dashed boxes 56 and 58. While this example demonstrates the user selecting individual function blocks, in some arrangements the user selects the entire block diagram model (i.e., a global selection) for applying one or more constraints to each function block included in the block diagram model. In still other examples of user selections, in addition to selecting one or more individual function blocks, the user can also select a region of the block diagram model. By selecting a region, each of the function blocks contained in the selected region are displayed to the user with a respective dashed box, or other highlighting technique. In another example, the user can select a class of function blocks. For example, the user may select all function blocks that perform a Fast Fourier Transform (FFT) for applying one or more constraints.

Figure 2E:
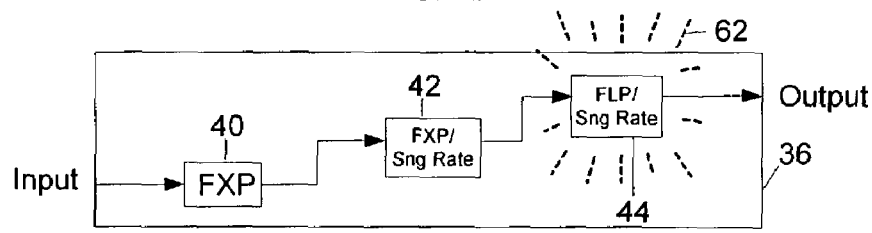

Referring to FIG. 2e, after selecting function blocks 42 and 44, the constraint and optimization process 24 (shown in FIG. 1) constrains each of the two function blocks to operate at a single data rate. In this particular example, in applying the single data rate constraint, the constraint and optimization process 24 modifies the setting(s) associated with each of the two function blocks 42 and 44. However, as shown in FIG. 2b in some arrangements the constraint and optimization process 24 alerts the user to modify the function blocks to satisfy the applied constraint. In this particular example, the application of the second constraint is represented by adding "Sng Rate" to both function block 42 and 44.

Additionally, in this particular example the optimizing process included in the constraint and optimization process 24 is executed. Based on the selected function blocks 42 and 44, the constraint and optimization process 24 determines that performance (e.g., increase execution speed, reduce the amount of memory used, or other similar performance condition) of the selected function blocks can be optimized. Conditions for optimizing performance are typically selected by the user so that the constraint and optimization process 24 determines potential modifications to meet the selected conditions. For example, the constraint and optimization process 24 determines potential modifications to the selected block functions 42 and 44 for increased execution speed. As shown in FIG. 2e, the constraint and optimization process 24 determines that execution speed can be increased if the function block 44 is similarly constrained to fixed-point operations. By constraining function block 42 and 44 to fixed-point operations, execution speed of the selected functions blocks and the block diagram model as a whole increases. Thus, by constraining function block 44 to fixed-point operations optimal performance is achieved. In this particular example, the constraint and optimization process 24 applies a highlight 62 to the function block 44 to alert the user to the potential modification for optimizing performance.

Figure 2F:
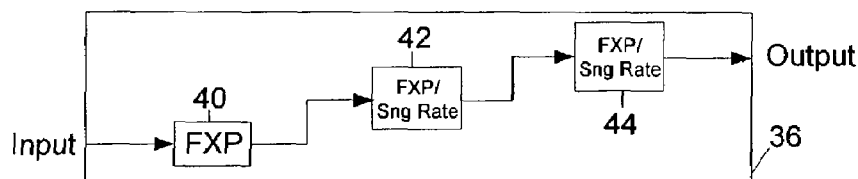

Referring to FIG. 2f, based on the alert of sub-optimal performance, the user modifies the settings of the function block 44 such that the function block is constrained to perform only fixed-point operations. This modification, along with the applying of the second constraint (i.e., single data rate operation) is represented by the label "FXP/Sng Rate" on the function block 42 and 44. After the modification is complete the executing constraint and optimization process 24 determines again that the block diagram model 36 is in a functioning state. Since the block diagram model 36 is in a functioning state, both the first constraint (i.e., fixed-point operation) that is applied to function blocks 40, 42, and 44 and the second constraint (i.e., single data rate operation) applied to function blocks 42 and 44 are stored on the storage device 28 for retrieval at a later time to revert the function blocks to the current functioning state, or for use in developing a different block diagram model, or other similar function. Additionally, in some arrangements, the block diagram model 36 or the individual functions blocks 40, 42, and 44 are stored on the storage device 28 along with the respectively applied constraints. Once the applied constraints are stored, the constraint and optimization process 24 executes iteratively by returning to further constrain the block diagram model 36, or remove a constraint, as selected by the user or as provided by another source such as the storage device 28.

Figure 3:
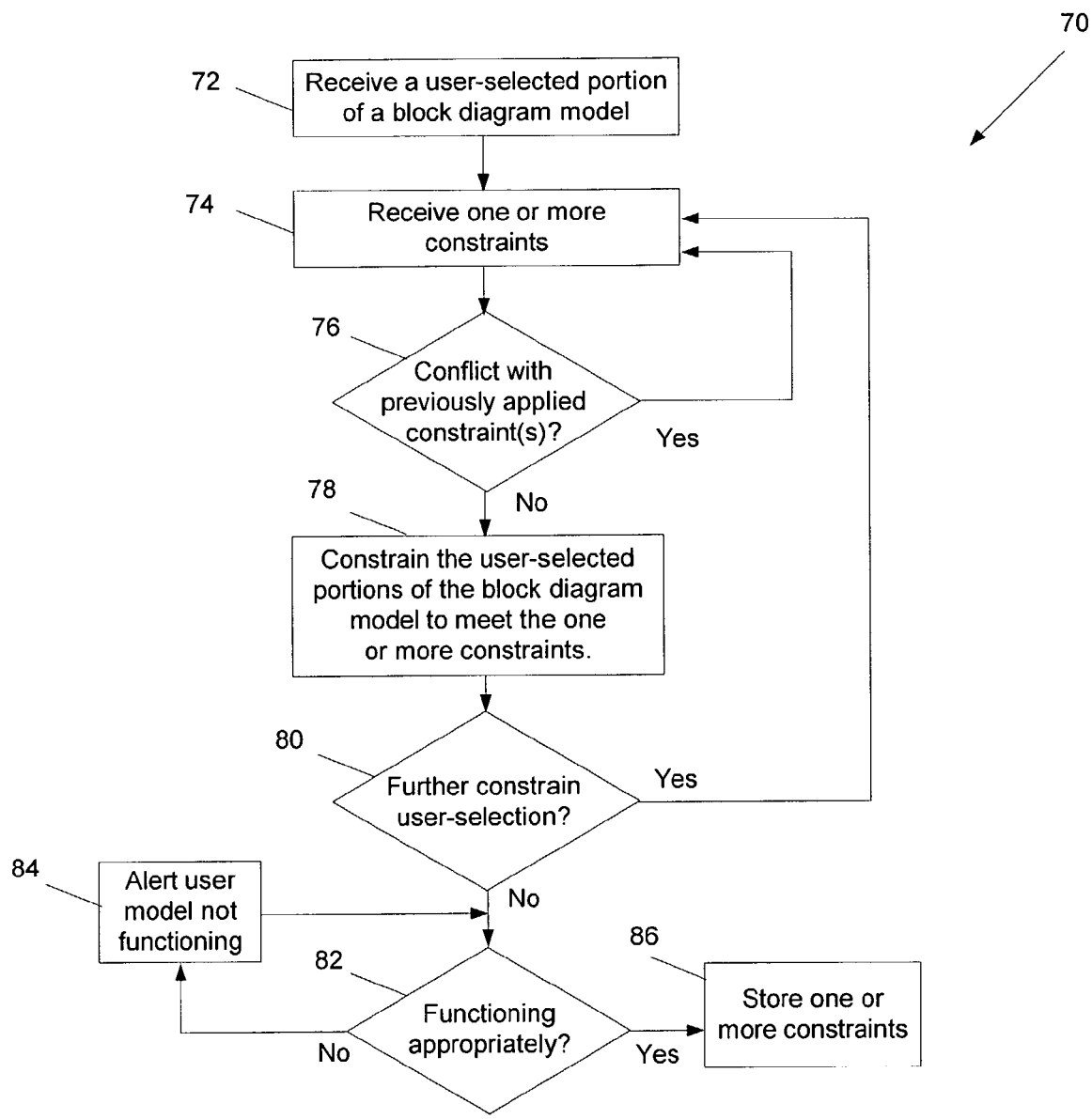
FIG. 3 is a flow diagram of a constraining process.

Referring to FIG. 3 an exemplary embodiment of a constraining process 70 is shown. The constraining process 70 receives (72) a user-selected portion of a block diagram model under development that has no constraints applied or some constraints previously applied. The user-selected portion of the block diagram model may include one or more function blocks (i.e., individually selected function blocks), or a section of a block diagram model (i.e., a user-selected region of a block diagram model), or an entire block model diagram (i.e., a global user-selection of a block diagram model). In some arrangements a particular class or type of function block is the user-selected portion of the block diagram model. For example, the user selects all Fast Fourier Transform (FFT) function blocks. Also, in some arrangements, the received portion of the block diagram model may have been previously developed and retrieved from a storage device, such as the storage device 28 shown in FIG. 1. For example, the received user-selected portion may be from a block diagram model that is under development and is provided from a development process such as the Simulink® software package from Mathworks, Inc, of Natick, Mass., incorporated by reference herein.

After receiving (72) the user-selected portion of the block diagram model, the constraining process 70 receives (74) one or more constraints. In some arrangement the user supplies the constraint. However, in some arrangements, the one or more constraints are received from a storage device, such as the storage device 28 shown in FIG. 1 and selected by the user. After receiving (74) the one or more constraints, the constraining process 70 determines (76) if any of the one or more constraints conflicts with any previously applied constraints to the selected portion. If determined that one or more constraints do conflict with previously applied constraints, the constraint process returns to receive one or more constraints (74). By returning to receive one or more constraints, the user can modify the constraints to be applied to resolve the conflict. However, if determined that one or more constraints do not conflict with any previously applied constraints, the constraining process 70 constrains (78) the user-selected portion of the block diagram model to meet the one or more constraints. In some arrangements the constraining process 70 alerts the user which function block(s) violate the one or more constraints so that the user can modify the function blocks to meet the constraint. In other arrangements the constraint process 70 modifies the violating function blocks for the one or more constraints applied. After constraining (78) the user-selected portion of the block diagram model, the constraining process 70, determines (80) whether to further constrain the user-selected portion of the block diagram model. If determined to further constrain the user-selection, the constraining process 70 returns to receive (74) one or more further constraints. If determined not to further constrain the user-selection, the constraint process 70 determines (82) if the block diagram model is functioning appropriately. If determined that the block diagram model is not functioning appropriately, the constraining process 70 alerts (84) the user that the model is malfunctioning and waits for the user to modify the block diagram model for appropriate functioning. However, in some arrangements, the constraining process 70 provides the user with a capability to continue without the block diagram model functioning appropriately. If determined that the block diagram model is functioning appropriately, the constraining process 70 stores (86) the one or more constraints applied to the block diagram model. In some arrangements the constraining process 70 stores all of the constraints applied, including previously applied constraints, to a storage device. Additionally, in some arrangements, the constraint process 70 stores the constraints applied, with or with out the previously applied constraints, along with the block diagram model or a portion of the block diagram model.

Along with applying constraint to block diagram models, the constraint and optimization process 24 (shown in FIG. 1) is capable of removing one or more previously applied constraints from a block diagram model or a portion of a block diagram model. By removing one or more constraints, the constraint and optimization process 24 provides the user the ability to apply and remove constraints in an iterative fashion. So as a block diagram model is developed, the user can add and remove constraints to experiment with various design alternatives.

Figure 4:
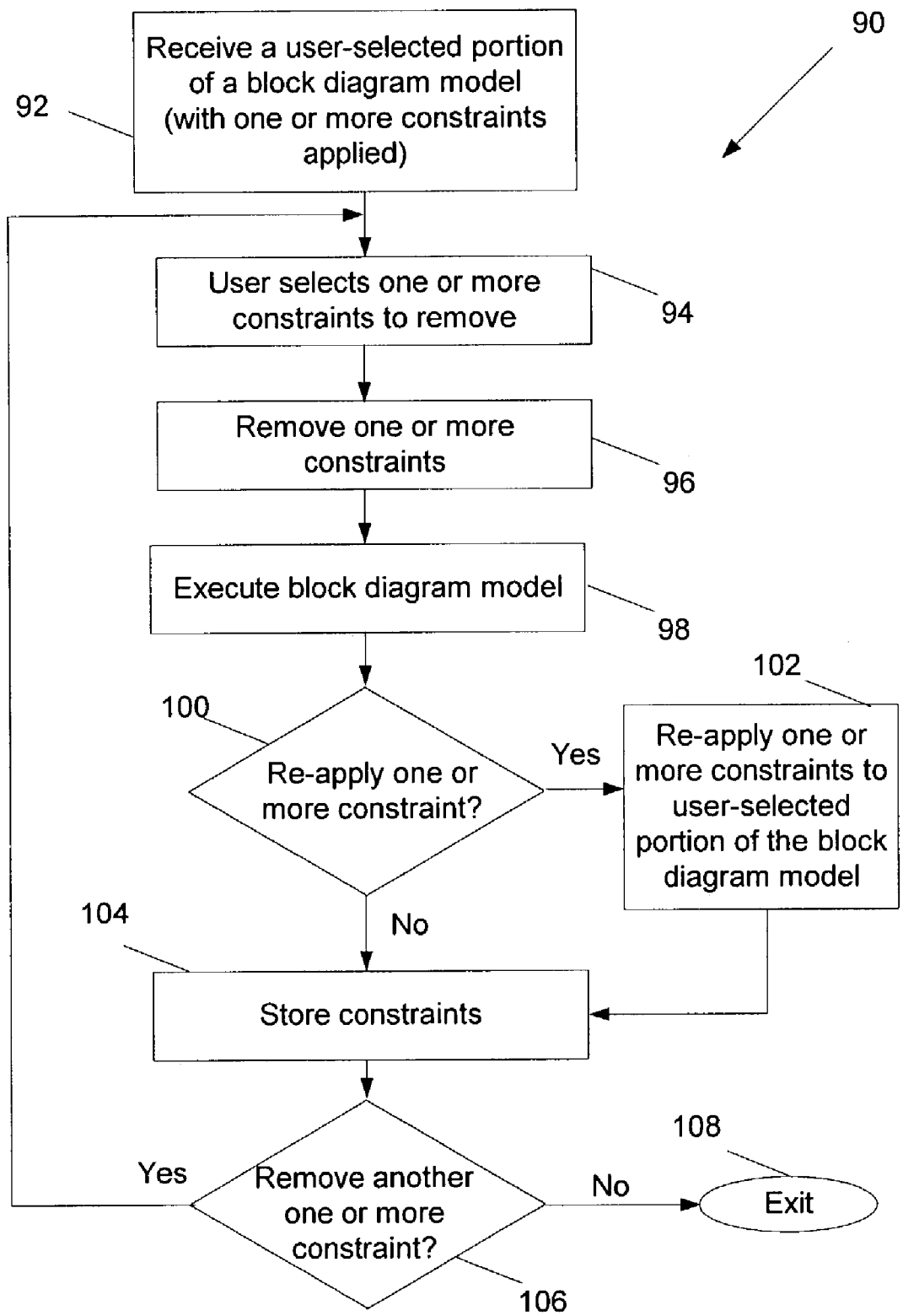
FIG. 4 is a flow diagram of a constraint removal process.

Referring to FIG. 4, an exemplary embodiment of a constraint removal process 90 is shown that allows a user to remove and re-apply constraints iteratively so that the user can analyze functioning of a block diagram model under different constraint conditions. The constraint removal process 90 receives (92) a user-selected portion of a block diagram model with one or more constraints applied. Similar to the constraint and optimization process 70 shown in FIG. 3, the received portion of the block diagram model is selected by the user on an individual function block user-selection basis, a regional user-selection basis, or a global user-selection basis. Additionally, in some arrangements the user-selection is a particular class or type of function block (e.g., all FFT function blocks). Also, in some arrangements, the received portion of the block diagram model may have been previously developed and retrieved from a storage device, such as the storage device 28 shown in FIG. 1. In still other arrangements the received portion of the block diagram model is currently under development. After receiving (92) the user-selected portion of the block diagram model, the constraint removal process 90 removes (96) the one or more selected constraints from the user-selected portion of the block diagram model. Typically the user provides input to the constraint removal process 110 to aid in determining which of the one or more constraints are to be removed. Alternatively, in some arrangements the constraint(s) to be removed may be previously determined and identified from information retrieved from the storage device 28 (shown in FIG. 1). After the one or more constraints are removed (96), the constraint removal process 90 executes (98) the block diagram model so that the user can determine if the constraint removal is functioning appropriately for the development of the block diagram model. After executing (98) the block diagram model, the constraint removal process 90 determines (100) whether to re-apply one or more of the recently removed constraints. Typically, the user supplies information to the constraint removal process 110 to aid in the determination. If determined to re-apply one or more of the constraints, the constraint removal process 90 re-applies (102) one or more constraints of the recently removed constraints to the user-selected portion of the block diagram model and then the constraint removal process 90 stores (104) the constraints applied to the block diagram model. However, in some arrangements, the block diagram model, or a portion of the block diagram model (e.g., individual function blocks) are stored along with the applied constraints. If determined that the one or more constraints are not to be re-applied, the constraint removal process 90 stores (104) the constraints applied to the block diagram model and as mentioned, in some arrangements the constraint removal process 90 stores the block diagram model with the applied constraints. After storing (104) the constraints, the constraint removal process 90 determines (106) if another one or more constraints is to be removed. Typically, the user provides information to the constraint removal process 90 to aid in the determination if one or more additional constraints are to be removed. If determined that one or more constraints are to be removed, the constraint removal process 90 returns to the user selecting (94) the next one or more constraints to be removed. If determined that the no further constraints are to be removed the constraint removal process 90 exits (108).

Referring again to FIG. 1, besides constraining block diagram models, the constraint and optimization process 24 determines if a block diagram is optimally performing based on one or more performance conditions. Typically these performance conditions concern increasing execution speed of the block diagram model, improving memory use, or other similar improvement in performance. In general, by determining potential modifications to a block diagram model for improved performance, the user can then constrain the block diagram model, or a portion of the block diagram model, to achieve one or more or the modifications and improve performance.

Figure 5:
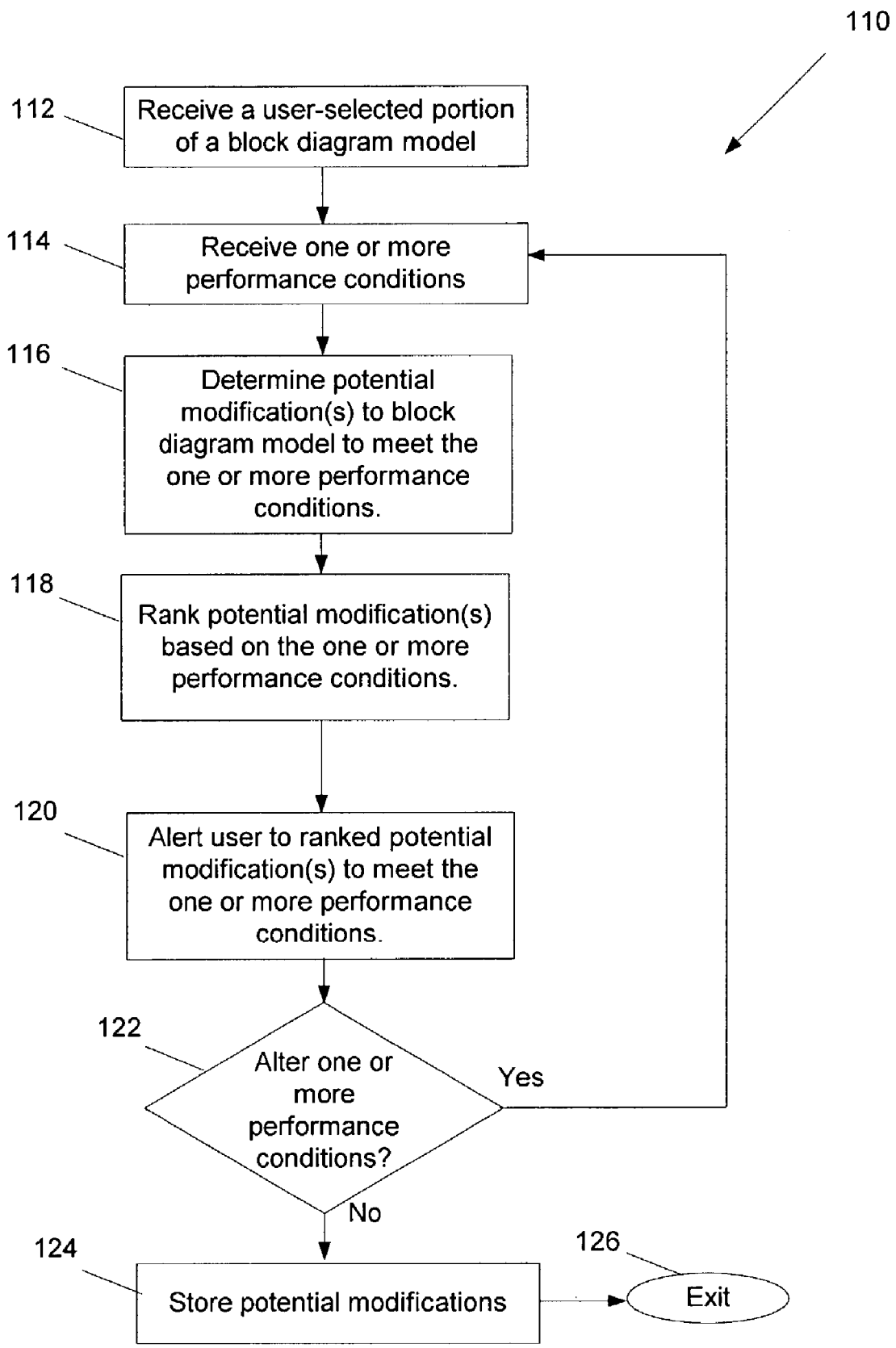
FIG. 5 is a flow diagram of an optimizing process.

Referring to FIG. 5, an exemplary embodiment of an optimizing process 110 is shown. The optimizing process 110 receives (112) a user-selected portion (e.g., function block selection, regional selection, or global selection) of a block diagram model. In some arrangements the user-selected portion of the block diagram model includes a class or type of function blocks (e.g., FFT function blocks). The optimizing process 110 receives (114) one or more performance conditions (e.g., improve execution speed, improve memory use, etc.). Typically the user selects and provides the performance conditions to the optimizing process 110. Additionally, in some arrangements the user ranks the performance conditions to be applied based on the importance of the conditions relative to the development of the block model diagram. For example, the user may rank improving execution speed above improving memory use, or some other similar ranking scenario. Alternatively, in some arrangements the performance conditions are pre-ranked and received from a storage device, such as the storage device 28 shown in FIG. 1.

The optimizing process 110 determines (116) potential modifications to the user-selected portion of the block diagram model to meet the performance conditions. For example, to improve execution speed the optimizing process 110 determines that all function blocks included in the user-selection should be constrained to operate at a single data rate. After determining (116) the potential modifications, the optimizing process 110 ranks (118) the potential modifications e.g. based on ranking of the performance conditions. Alternatively, in some arrangements, the potential modification ranking is based on the level of complexity to make the modification. For example, if a minor modification is needed to improve execution speed, the rank of that minor modification is higher than a complex modification to improve memory use.

After ranking (118) the potential modifications, the optimizing process 110 alerts (120) the user to the ranked potential modifications. In some arrangements the user is alerted by displaying the ranked potential modifications on a computer system, such as the computer system 26 (shown in FIG. 1) or other similar electronic device. After alerting (120) the user to the ranked potential modifications, the optimizing process 110 determines (122) if one or more of the performance conditions are to be altered. For example, the user may determine to add or remove one or more performance conditions and re-optimize the portion of the block diagram model. If determined that the one or more performance conditions are to be altered, the optimizing process 110 returns to receive (114) one or more performance conditions. If determined that the one or more performance conditions are not to be alter, typically from input from the user, the optimizing process 110 stores (124) the potential modifications, for example for use in other development efforts, and exits (126) to possibly execute other functions such as the constraint process 70 (shown in FIG. 3).

By storing the potential modifications for improving performance of a block diagram model, the potential modifications can be used at a later time to decrease development time for other block diagram models. Additionally, by managing the stored potential modifications, the modifications can be sorted and grouped for efficient application during model development. For example, some potential modifications can be grouped for use in optimizing block diagram models that are executed on integrated circuits (IC), while other potential modifications can be grouped for use with block diagram models that simulate execution on an IC. Additionally, by developing libraries of potential modifications, business entities can be provided libraries for use with a particular product. For example, a manufacturer can provide a library of potential modifications along with its manufactured digital signal processing (DSP) board so that the user can develop block diagram model that are optimized for executing on the DSP board.

Figure 6:
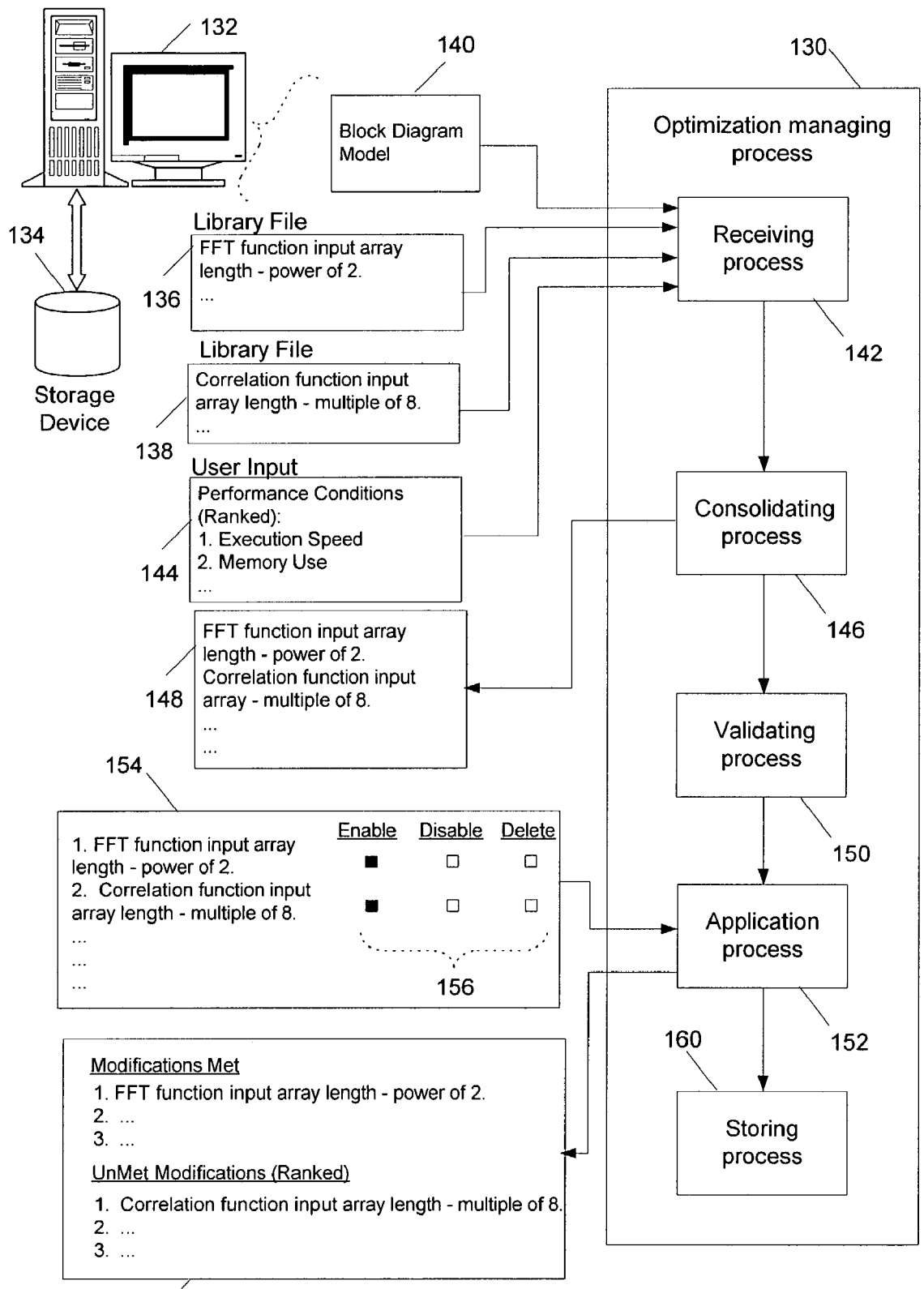
FIG. 6 depicts a constraint managing process.

Referring to FIG. 6, an optimization managing process 130 is shown that executes on a computer system 132 and is stored on a storage device 134 (e.g., a hard drive, CD-ROM, etc.) that is in communication with the computer system. The storage device 134 also stores, in this particular example, two library files 136 and 138. Each of the library files 136, 138 contain potential modifications for improving the performance of a block diagram model 140 being developed on the computer system 132. For example, library file 136 includes a potential modification that "FFT function input array lengths have a power of 2 elements". Also, library file 138 includes a modification, for example, that "Correlation function input array lengths be a multiple of 8". In this example, both of these particular potential modifications improve the execution speed of the block diagram model 140.

The optimization managing process 130 includes a receiving process 142 that receives the two library files 136 and 138 for use in determining potential modification to the block diagram model 140 that is also received by the receiving process. Additionally, the receiving process 142 also receives input 144 from a user. In this particular example, the user input 144 includes the performance conditions that the user would like to apply to the block diagram model 140. Further, the user has ranked the performance conditions based on their level of importance as determined by the user. In this example the user has ranked improved execution speed as most important and improved memory use as next in importance. Typically the user input 144 is entered into the computer system 132, however, in some arrangements the user input is received from a file stored on the storage device 134. However, in some arrangements the user input 144 includes unranked performance conditions that are ranked by the optimization managing process 130. Further, in other arrangements, no user input is requested and the performance conditions are provided by the optimization process.

After the two library files 136, 138, the block diagram model 140, and the user input 144 are received by the receiving process 142, the information is passed to a consolidating process 146. The consolidating process 146 consolidates the potential modifications by removing redundant potential modifications that are present in more than one of the library files 136, 138. In this particular example, no redundancy is present in the library files 136, 138. After consolidating the potential modifications, the consolidating process 146 produces a consolidated library file 148 that contains the potential modifications to be applied to the block diagram model 140. In some arrangements, the consolidated library file 148 is stored on the storage device 134 for later retrieval and applying to other block diagram models. In this particular example, the consolidated library file 148 includes each of the potential modifications from the library files 136 and 138.

Once produced, the consolidated library file 148 is transferred to a validating process 150. The validating process 150 determines if any two or more of the potential modifications included in the consolidated library file conflict. To conflict, the two or more potential modification need to suggest respective modifications that cannot function mutually. For example, if one potential modification calls for FFT function input array lengths to include a number of elements that is a power of 2 and a second modification calls for FFT function input array lengths to include a number of elements that is a power of 3, the two modifications conflict with each other. In such a case, the validating process 150 detects the conflict and alerts the user to the conflict and in some arrangements requests that the user select one of the conflicting modifications for use or provide another potential modification that does not conflict with either of the two.

After determining if the consolidated potential modifications are valid, the validated potential modifications are passed to an application process 152 for determining if and how the validated potential modifications can be applied to the block diagram model 140 to satisfy the conditions provided in the user input 144. However, prior to determining if and how each validated potential modification can be applied, the application process 152 requests that the user select which of the validated potential modifications to use. In some arrangements, a list 154 of validated potential modifications is displayed to the user on the computer system 132. Along with the validated potential modifications, the list 154 includes selection buttons 156 so that the user can select to use (i.e., enable) an individual modification, not use (i.e., disable) an individual modification, or remove (i.e., delete) an individual modification. However, in some arrangements other selection techniques may be provided by the application process 152. In this particular example, the user has enabled both of the validated potential modifications shown in the list 154.

Once selected, the application process 152 determines if the enabled potential modifications are already met by the block diagram model 140 or can be applied to the block diagram model to meet one or more of the user input conditions 144. Additionally, if the application process 152 determines that a particular validated potential modification is not met by the block diagram 140, the application process determines what changes to the block diagram model 140 are needed to satisfy the validated potential modification. For example, if the block diagram model 140 includes one or more correlation functions that allow input array lengths of any length, the application process 152 determines that by constraining the input array lengths to a multiple of 8, the execution speed of the block diagram model would increase and meet the higher ranked condition provided by the user input 144. In some arrangements the application process 152 includes the optimizing process 110 (shown in FIG. 5) or the functionality of the optimizing process.

In some arrangements the unmet modifications are ranked based other ranking metrics such as the number of alterations needed to meet the unmet modifications, or the degree difficulty in implementing alterations to meet the unmet modifications, or other similar ranking metric. For example, ranking by number of needed alterations, if a first modification needs two alterations implemented in the block diagram model 140 to be met and a second modification needs one alteration implemented in the block diagram model 140 to be met, the second modification is ranked higher than the first since the second modification needs only one alteration implemented. However, in another example using the degree of difficulty metric, if the two alterations needed to meet the first modification are relatively easy to implement in the block diagram model 140 and the one alteration needed to meet the second modification is relatively difficult to implement, the first modification is ranked higher than the second modification based on the easier implementation of the two alterations associated with the first modification. Additionally, in some arrangements, user input is used by the optimization managing process 130 to determine the one or more ranking metrics. However, in other arrangements, no user input is requested and the one or more ranking metrics are determined by the optimization managing process 130.

After determining if each validated potential modification is met by the block diagram model 140, or if not met, the changes to the block diagram model needed to satisfy the unmet modification, the application process 152 reports these results to the user. In some arrangements a list 158 of the validated potential modifications met and the validated potential modifications unmet are displayed on the computer system 132. In this particular example, the block diagram model 140 met the validated potential modification that FFT function input array lengths be a power of 2 but did not meet the validated potential modification that correlation function input array lengths be a multiple of 8. So the former validated potential modification is displayed as met on the list 158 while the later potential validated modification is displayed as unmet. Additionally, the unmet validated potential modifications are ranked based on the ranked conditions provided by the user input 144. In this particular example, since the user highly ranked improved execution speed as a performance condition, the unmet validated potential modification associated with the correlation functions is ranked first. Additionally, in some arrangements, the list 154 provides the changes needed for the block diagram model 140 to comply with the unmet validated potential modifications and may rank them based on whether the changes are relatively minor or quite complex, or some other similar ranking metric.

In some arrangements, after displaying the list 158 of validated potential modifications that are met or unmet, the application process 152 re-displays the list 154 of validated potential modifications. By re-displaying the list 154, the user can further enable, disable, and, delete validated potential modifications to systemically apply different combinations of validated potential modifications to the block diagram model 140. By providing this iterative capability, the user can apply different groups of validated potential modifications to aid in the development of the block diagram model 140.

Additionally, in some arrangements, the optimization managing process 130 includes a storing process 160 that allows the user to store various combinations of the validated potential modifications. By storing the combinations of the validated potential modifications, the user can develop more library files that include different combinations of validated potential modifications that can be used to reduce design time of other block diagram model developments. Additionally, in some arrangements, the validated potential modifications are stored along with the block diagram model 140. Further, by storing validated potential modifications that are not met by the block diagram model 140, the user can use the unmet validated potential modifications in constraining the block diagram model so that the validated potential modifications are met.

Figure 7:
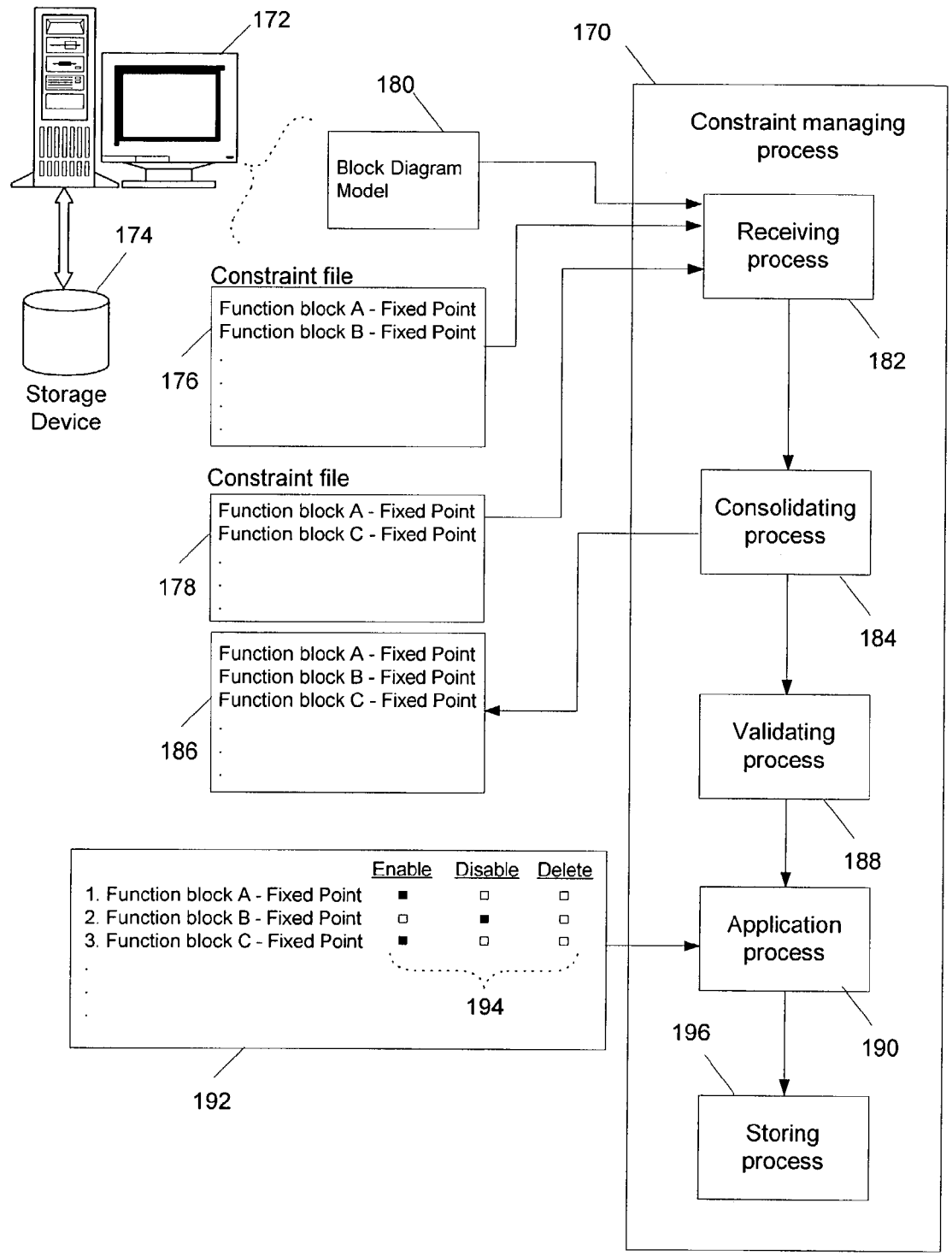
FIG. 7 depicts an optimizing managing process.

Referring to FIG. 7, a constraint managing process 170 is shown that executes on a computer system 172 and is stored on a storage device 174 (e.g., a hard drive, CD-ROM, etc.) that is in communication with the computer system. The storage device 174 also stores, in this particular example, two constraint files 176 and 178. Each of the constraint files 176, 178 contain constraints to apply to a block diagram model 180, which include function blocks A, B, and C (not shown), being developed on the computer system 172. The constraint file 176 includes one constraint that function block A be constrained to fixed-point operations and another constraint that function block B also be constrained to fixed-point operations. Similarly, constraint file 178 includes one constraint that function block A be constrained to fixed-point operations and a second constraint that the function block C be constrained to fixed-point operations. In some arrangements the constraint files 176 and 178 are provided by business entities (e.g., manufacturers, developers, etc.) so that a user can apply the constraints to a block diagram model that is under development for executing on a specialized computer board (e.g., a DSP board) or other similar device. Or in another example, the business entity supplies one or both of the constraint files 176 and 178 so that the user can constrain the block diagram model 180 for simulating execution on the computer board. Further in some arrangements, one constraint file (e.g., constraint file 176) can include data identifying another constraint file (e.g., constraint file 178) so that when the first constraint file is received by the constraint managing process 170 the identified constraint file is retrieved for use with the first by the constraint managing process 170. By including such identifying data in one or more constraint files, a user can group constraint files, along with included constraints, and efficiently transfer the constraints included in a group of constraint files into the constraint managing process 170 or other similar processes. Additionally, by nesting constraint files by referencing one or more constraint files in another constraint file, a user can produce a hierarchical structure for using constraints and constraint files.

The constraint managing process 170 includes a receiving process 182 that receives the two constraint files 176 and 178 for constraining the block diagram model 180, which is also received. After the two constraint files 176, 178 and the block diagram model 180 are received by the receiving process 182, the constraints in the constraint files are passed to a consolidating process 184. The consolidating process 184 consolidates the constraints by removing redundant constraints that may be present in more than one of the constraint files 176, 178. In this particular example, the constraint that function block A be constrained to fixed-point operations is present in both constraint file 176 and constraint file 178. Due to this redundancy, the consolidating process 184 consolidates the constraints from the two constraint files 176, 178 into a consolidated constraint file 186 that does not include the redundant constraint associated with function block A. In some arrangements, the consolidated constraint file 186 is stored on the storage device 174 for retrieval at a later time for use in constraining other block diagram models.

Once produced, the information in the consolidated constraint file 186 is transferred to a validating process 188. The validating process 188 determines if any two or more of the constraints included in the constraint file 186 conflict. For example, if one constraint calls for function block A to be constrained to fixed point operations and a second constraint calls for function block A to be constrained to floating point operations, the two constraints conflict with each other. In such as case, the validating process 188 detects the conflict and alerts the user to the conflict and in some arrangements requests that the user select one of the conflicting constraints for applying to the block diagram model 180 or provide another constraint that does not conflict with either of the two constraints.

After determining if the constraints are valid, the validated constraints are passed to an application process 190 for applying the validated constraints to the block diagram model 180. However, prior to applying the validated constraints, the application process 190 requests that the user select which of the validated constraints to apply to the block diagram model 180. In some arrangements, a list 192 of the validated constraints is displayed to the user on the computer system 172. Along with the validated constraints, the list 192 also includes selection buttons 194 so that the user can select to apply (i.e., enable) each particular constraint, or not to apply (i.e., disable) a particular constraint, or to remove a particular constraint (i.e., delete). However, in some arrangements other selection techniques may be provided by the application process 190. Additionally, in some arrangements the user is allowed to select groups of validated constraints based on one or more criteria (e.g., develop time of block diagram model, block diagram model milestones, etc.).

Once selected, the application process 190 applies the selected validated constraints to the block diagram model 180. In this particular example, the validated constraints associated with function block A and C are enabled while the validated constraint associated with function block B is disabled. In some arrangements the selected validated constraints are applied as described by the constraint process 70 shown in FIG. 3. Also in some arrangements, after applying the selected validated constraints, the application process 190 re-displays the list 192 of validated constraints. By re-displaying the list 192, the user can further enable, disable, or delete the validated constraints to systemically in an iterative fashion apply different combinations of the constraints. By providing this iterative capability, the user can apply different groups of constraints to aid in the development of the block diagram model 180.

Additionally, in some arrangements, the constraint managing process 170 includes a storing process 196 that allows the user to store various combinations of the validated constraints. By storing the combinations of the validated constraints, the user can develop libraries of constraint files for different block diagram model developments and design scenarios that reduce design time and development effort by the user. Additionally, in some arrangements the consolidated constraint file 186 is stored on the storage device 174 to provide a constraint file that contains the consolidated constraints from constraint files 176 and 178.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In conjunction with FIG. 1, the block diagram model was constrained by the constraint and optimization process 24 to fixed-point operations, discrete time processing, and for a single data rate. Alternatively, in some arrangements, a block diagram model can be constrained to floating-point operations, continuous time processing, or multiple data rates individually or in combination. Further, in some arrangements other types of constraints can be applied to a block diagram model. For example, a constraint can prohibit a particular type of function block from being included or a particular mode of operation of a function block from being executed in a block model diagram. Additionally specific attributes can be constrained such as the bit width of the fixed-point or floating-point numbers, binary point location, signal dimensions, real or complex numbers, or other similar attributes individually or in combination. Also a block model diagram, or a portion or the block model diagram can be constrained for the computation precision such as single precision or double precision. Additionally, a block model diagram can be constrained to other attributes such as particular data types, complexity, dimensionally, number of channels, the use of frame based signals, etc. Also the latency through a block diagram model can be constrained, for example, by constraining the frame size associated with the block diagram model.

Constraints can also be based on the particular user of the block diagram model. For example a manufacturer, or other business entity is only capable of supporting a particular set of function blocks or particular operation mode of particular function blocks. Based on these limitations, or desired operation modes, block diagram models can be constrained to operate under business entity-specific constraints. Further, constraints may be based on particular equipment or products associated with the block diagram model. For example, a block diagram model developed for execution on a particular computer board can be constrained to use function blocks supportable by the board. Also, attributes of function blocks can be constrained for optimizing code associated with the function block. For example, a function block that performs an autocorrelation function may be constrained to accept input data in grouped in multiple of eights for optimal execution of the autocorrelation function. Additionally, graphics (e.g., text fonts, colors, language, etc.) may be constrained in block diagram models of function blocks.

In conjunction with FIG. 1, an applied constraint along with the settings of the function blocks were stored on the storage device 28 when the constraint and optimization process 24 determined that the constrained block diagram model is functioning appropriately. However, in some arrangements more than one constraint is stored together on the storage unit 28 for use in future developments or to revert a block diagram model to a previous condition.

Also in conjunction with FIG. 1, in some arrangements the constraint and optimization process 24 is implemented with a graphic user interface (GUI) that includes a workspace and graphical semantics such that a user is guided through the process of selecting and applying one or more constraints to a block diagram model. Additionally, by implementing the constraint and optimization process 24 in a GUI, one or more options can be displayed to the user for modifying a block diagram model, or a portion or the block diagram model, which is in conflict with one or more selected constraints. The GUI implementation can also provide options to the user to optimize performance of the block diagram model. For example, the GUI can display to the user one or more modifications that can be applied to the block diagram model to increase execution speed, reduce memory use, etc. Furthermore, a GUI implementation of the constraint and optimization process 24 can provide the user with a list of the constraints, setting modifications, etc. that are stored on the storage unit 28 that are ready for applying to block diagram models under development. By providing such a list, the GUI provides a library to the user for reference and for selecting constraints for application.

In conjunction with FIG. 1, modifications were provided to a user to constrain and optimize a block diagram model. However, in other arrangements the constraint and optimization process 24 can be used to constrain and optimize other types of models. For example, models written in scripts (e.g., M-files) used by MATLAB® from the Mathworks Inc. of Natick, Mass., which is herein incorporated by reference. Additionally, in some arrangements, the constraint and optimization process 24 can be used to constrain and optimize models written in other high-level or low-level computer languages.

Other embodiments are within the scope of the following claims.

What is claimed is:

1. A computer-implemented method, comprising:
   obtaining a block diagram model of a system, wherein the block diagram model contains a plurality of blocks, wherein each block has associated settings that control operation of the block, wherein the associated settings can be of different types, and wherein the block diagram model provides a graphical model of the system;
   receiving information identifying a user selection of a first portion of the block diagram model, wherein the first portion of the block diagram model contains more than one block;
   determining a first constraint for constraining operation of the first portion of the block diagram model;
   applying the first constraint to constrain operation of the first portion of the block diagram model by constraining a value of one type of setting in each block within the first portion that has the type of setting associated with the first constraint;
   determining if at least one block in the first portion of the block diagram model violates the first constraint; and
   outputting information based on the determining if at least one block in the first portion of the block diagram model violates the first constraint and storing the first constraint when the blocks in the first portion of the block diagram model do not violate the first constraint.

2. The method of claim 1 further comprising:
   determining if a second portion of the block diagram model can operate with a performance condition; and
   providing the user a modification based on the second portion of the block diagram model executing with the performance condition.

3. The method of claim 1 further comprising storing the first constraint with the first portion of the block diagram model.

4. The method of claim 1, wherein determining a first constraint includes receiving the first constraint from a storage device.

5. The method of claim 1, further comprising removing the first constraint from constraining operation of the at least one block in the first portion of the block diagram model.

6. The method of claim 1, wherein determining the first constraint for constraining operation of the first portion of the block diagram model comprises receiving information identifying a user selection of the first constraint.

7. The method of claim 1 in which the first portion of the block diagram model includes a function block.

8. The method of claim 1 in which the first portion of the block diagram model includes an entire block diagram model.

9. The method of claim 1, in which the first portion of the block diagram model includes a type of function block, and wherein the first portion constitutes less than all of the blocks of the block diagram.

10. The method of claim 1 in which the first constraint is based on data used by the first portion of the block diagram model.

11. The method of claim 1 in which the first constraint is based on an attribute of a fixed-point number.

12. The method of claim 1 in which the first constraint is based on a business entity.

13. The method of claim 2 in which the second portion includes the first portion of the block diagram model.

14. The method of claim 1, wherein determining a first constraint for constraining operation of the first portion of the block diagram model includes receiving the first constraint and a second constraint.

15. The method of claim 14, wherein determining a first constraint for constraining operation of the first portion of the block diagram model includes determining if the first constraint and the second constraint are redundant.

16. The method of claim 14, wherein determining a first constraint for constraining operation of the first portion of the block diagram model includes determining if the first constraint and the second constraint conflict.

17. The method of claim 1, wherein the first portion of the block diagram includes a first block that is not hierarchically related to a second block in the first portion of the block diagram.

18. The method of claim 14 further comprising storing the first constraint and the second constraint.

19. The method of claim 1, further comprising constraining at least one selected block in the first portion of the block diagram model to meet the first constraint if the selected block in the first portion of the block diagram model violates the first constraint.

20. A computer-implemented constraint applying process, comprising:
   an obtaining process to obtain a block diagram model of a system, wherein the block diagram model contains a plurality of blocks, wherein each block has associated settings that control operation of the block, wherein the associated settings can be of different types, and wherein the block diagram model provides a graphical model of the system;
   a receiving process to receive information identifying a user selection of a first portion of the block diagram model, wherein the first portion of the block diagram model contains more than one block;
   a first determining process to determine a first constraint for constraining operation of the first portion of a block diagram model,
   an applying process to apply the first constraint to constrain operation of the first portion of the block diagram model by constraining a value of one type of setting in each block within the first portion that has the type of setting associated with the first constraint;
   a second determining process to determine if at least one block in the first portion of the block diagram model violates the first constraint;
   a first outputting process to output information based on the determining if at least one block in the first portion of the block diagram model violates the first constraint; and
   a storing process to store the first constraint when the blocks in the first portion of the block diagram model do not violate the first constraint.

21. The constraint applying process of claim 20 further comprising:
   a third determining process to determine if a second portion of the block diagram model can operate with a performance condition; and
   a second providing process to provide the user a modification based on the second portion of the block diagram operating with the performance condition.

22. The constraint applying process of claim 20 further comprising:
   a storing process to store the first constraint with the first portion of the block diagram model.

23. The constraint applying process of claim 20 in which determining the first constraint includes receiving the first constraint from a storage device.

24. The constraint applying process of claim 20, further comprising:
a removing process to remove the first constraint from constraining operation of at least one block in the first portion of the block diagram model.

25. The constraint applying process of claim 20, wherein determining a first constraint for constraining operation of the first portion of the block diagram model comprises receiving information identifying a user selection of the first constraint.

26. The constraint applying process of claim 20 in which the first portion of the block diagram model includes a function block.

27. The constraint applying process of claim 20 in which the first portion of the block diagram model includes an entire block diagram model.

28. The constraint applying process of claim 20, in which the first portion of the block diagram model includes a type of function block, and wherein the first portion constitutes less than all of the blocks of the block diagram.

29. The constraint applying process of claim 20 in which the first constraint is based on data used by the first portion of the block diagram model.

30. The constraint applying process of claim 20 in which the first constraint is based on an attribute of a fixed-point number.

31. The constraint applying process of claim 20 in which the first constraint is based on a business entity.

32. The constraint applying process of claim 21 in which the second portion includes the first portion of the block diagram model.

33. The constraint applying process of claim 20, wherein determining a first constraint for constraining operation of the first portion of the block diagram model includes receiving the first constraint and a second constraint.

34. The constraint applying process of claim 33, wherein determining a first constraint for constraining operation of the first portion of the block diagram model includes determining if the first constraint and the second constraint are redundant.

35. The constraint applying process of claim 33, where determining a first constraint for constraining operation of the first portion of the block diagram model includes determining if the first constraint and the second constraint conflict.

36. The constraint applying process of claim 1, wherein the first portion of the block diagram includes a first block that is not hierarchically related to a second block in the first portion of the block diagram.

37. The constraint applying process of claim 33 further comprising a storing process to store the first constraint and the second constraint.

38. The constraint applying process of claim 20, further comprising a constraining process to constrain at least one selected block in the first portion of the block diagram model to meet the first constraint if the selected block in the first portion of the block diagram model violates the first constraint.

39. A computer program product residing on a computer readable medium comprises instructions for applying a constraint, the instructions cause a computer to:
obtain a block diagram model of a system, wherein the block diagram model contains a plurality of blocks, wherein each block has associated settings that control operation of the block, wherein the associated settings can be of different types, and wherein the block diagram model provides a graphical model of the system;
receive information identifying a user selection of a first portion of the block diagram model, wherein the first portion of the block diagram model contains more than one block;
determine a first constraint for constraining operation of the first portion of a block diagram model;
apply the first constraint to constrain operation of the first portion of the block diagram model by constraining a value of one type of setting in each block within the first portion that has the type of setting associated with the first constraint;
determine if at least one block in the first portion of the block diagram model violates the first constraint; and
output information based on the determining if at least one block in the first portion of the block diagram model violates the first constraint and store the first constraint when the blocks in the first portion of the block diagram model do not violate the first constraint.

40. The computer program product of claim 39 further comprising instructions to cause a computer to:
determine if a second portion of the block diagram model can execute with a performance condition; and
provide the user a modification based on the second portion of the block diagram operating with the performance condition.

41. The computer program product of claim 39 further comprising instructions to cause a computer to:
store the first constraint with the first portion of the block diagram model.

42. The computer program product of claim 39, wherein instructions to cause a computer to determine the first constraint include instructions to cause a computer to receive the first constraint from a storage device.

43. The computer program product of claim 39, further comprising instructions to cause a computer to:
remove the first constraint from constraining operation of the at least one block in the first portion of the block diagram model.

44. The computer program product of claim 39, wherein instructions to cause a computer to determine a first constraint for constraining operation of the first portion of the block diagram model comprise instructions to cause a computer to receive information identifying a user selection of the first constraint.

45. The computer program product of claim 39 in which the first portion of the block diagram model includes a function block.

46. The computer program product of claim 39 in which the first portion of the block diagram model includes an entire block diagram model.

47. The computer program product of claim 39 in which the first portion of the block model includes a type of function block, and wherein the first portion constitutes less than all of the blocks of the block diagram.

48. The computer program product of claim 39 in which the first constraint is based on data used by the first portion of the block diagram model.

49. The computer program product of claim 39 in which the first constraint is based on an attribute of a fixed-point number.

50. The computer program product of claim 39 in which the first constraint is based on a business entity.

51. The computer program product of claim 40 in which the second portion includes the first portion of the block diagram model.

52. The computer program product of claim 39, wherein instructions to cause a computer to determine the first constraint for constraining operation of the first portion of the block diagram model include instructions to cause a computer to receive the first constraint and a second constraint.

53. The computer program product of claim 52, wherein instructions to cause a computer to determine the first constraint for constraining operation of at least one block in the first portion of the block diagram model include instructions to cause a computer to determine if the first constraint and the second constraint are redundant.

54. The computer program product of claim 52, wherein instructions to cause a computer to determine the first constraint for constraining operation of the first portion of the block diagram model include instructions to cause a computer to determine if the first constraint and the second constraint conflict.

55. The computer program product of claim 39, wherein the first portion of the block diagram includes a first block that is not hierarchically related to a second block in the first portion of the block diagram.

56. The computer program product of claim 52, further comprising instructions to cause a computer to:
store the first constraint and the second constraint.

57. The computer program product of claim 39, further comprising instructions to cause a computer to:
constrain at least one selected block in the first portion of the block diagram model to meet the first constraint if the selected block in the first portion of the block diagram model violates the first constraint.

58. A computer-implemented method, comprising:
receiving information identifying a user-selection of a first portion of a block diagram model of a system that provides a graphical model of the system, wherein the block diagram model contains a plurality of blocks, and wherein said first portion contains more than one block, and wherein each block has associated settings that control operation of the block;
receiving one or more constraints for constraining operation of the first portion of the block diagram model, wherein each of the one or more constraints constrains a value of one type of setting in each block within the first portion that has the type of setting associated with the first constraint;
determining if the one or more constraints conflict with a previously applied constraint;
constraining operation of the first portion of the block diagram model using the one or more constraints, when the one or more constraints do not conflict with a previously applied constraint;
determining if the model is functioning appropriately with the applied constraints, the applied constraints including previously applied constraints and the one or more constraints;
outputting information about the model not functioning appropriately when the model does not function appropriately with the applied constraints; and
storing the one or more constraints when the model is functioning appropriately with the applied constraints.

59. The method of claim 58, further comprising:
changing the one or more constraints before constraining operation of the first portion, if a previously applied constraint conflicts with the one or more constraints.

* * * * *

UNITED STATES PATENT AND TRADEMARK OFFICE
CERTIFICATE OF CORRECTION

| | | |
|---|---|---|
| PATENT NO. | : 7,424,410 B2 | |
| APPLICATION NO. | : 10/424990 | |
| DATED | : September 9, 2008 | |
| INVENTOR(S) | : Donald Paul Orofino, II et al. | |

It is certified that error appears in the above-identified patent and that said Letters Patent is hereby corrected as shown below:

At column 1, line 35 change "including" to --included--

At column 3, line 30 add "include" after the word can

At column 6, line 1 change "be" to --by--

At column 8, line 57 change "constrained" to --constraints--

At column 11, line 17 change "Mathworks, Inc," to --The MathWorks, Inc.,--

At column 11, line 28 change "conflicts" to --conflict--

At column 13, line 43 add "," after the word modifications

At column 13, line 44 add "," after the abbreviation e.g.

At column 13, line 65 change "alter" to --altered--

At column 15, line 61 add "on" after the word based

At column 15, line 62 add "of" after the word degree

At column 16, line 48 delete "," after the word and

At column 17, line 23 change "constraint" to --constrain--

At column 17, line 66 change "as" to --a--

At column 18, line 26 change "block" to --blocks--

At column 19, line 64 change "or" to --of--

UNITED STATES PATENT AND TRADEMARK OFFICE
CERTIFICATE OF CORRECTION

PATENT NO.        : 7,424,410 B2
APPLICATION NO. : 10/424990
DATED             : September 9, 2008
INVENTOR(S)       : Donald Paul Orofino, II et al.

It is certified that error appears in the above-identified patent and that said Letters Patent is hereby corrected as shown below:

At column 20, line 62 change "the Mathworks Inc." to --The MathWorks, Inc.--

Signed and Sealed this

Thirteenth Day of January, 2009

JON W. DUDAS
*Director of the United States Patent and Trademark Office*